United States Patent
Forsberg et al.

(10) Patent No.: US 7,263,353 B2
(45) Date of Patent: Aug. 28, 2007

(54) SYSTEM AND METHOD FOR AUTOMATIC APPLICATION PROFILE AND POLICY CREATION

(75) Inventors: Dan Forsberg, Helsinki (FI); Fan Yang, Helsinki (FI)

(73) Assignee: Nokia Corporation, Espoo (FI)

( * ) Notice: Subject to any disclaimer, the term of this patent is extended or adjusted under 35 U.S.C. 154(b) by 116 days.

(21) Appl. No.: 11/169,382

(22) Filed: Jun. 29, 2005

(65) Prior Publication Data

US 2007/0004393 A1  Jan. 4, 2007

(51) Int. Cl.
*H04Q 7/20* (2006.01)

(52) U.S. Cl. .................. 455/420; 455/432.3; 455/419

(58) Field of Classification Search .............. 455/403, 455/414.1, 418, 419, 420, 426.2, 435.2, 435.3, 455/461, 550.1, 433, 552.1, 560, 432.3; 370/331, 370/352, 467; 379/219, 230; 717/120, 121, 717/127, 176, 177, 178
See application file for complete search history.

(56) References Cited

U.S. PATENT DOCUMENTS

| | | | |
|---|---|---|---|
| 5,479,476 | A | 12/1995 | Finke-Anlauff |
| 6,202,206 | B1 | 3/2001 | Dean et al. |
| 2002/0154605 | A1 | 10/2002 | Preston et al. |
| 2004/0181779 | A1* | 9/2004 | Gorti ........................ 717/120 |
| 2006/0009235 | A1* | 1/2006 | Sheynblat et al. ....... 455/456.1 |
| 2006/0026588 | A1 | 2/2006 | Illowsky et al. |

FOREIGN PATENT DOCUMENTS

| | | |
|---|---|---|
| WO | WO98/26548 | 6/1998 |
| WO | WO 01/35585 A1 | 5/2001 |
| WO | WO 2004/008693 A1 | 1/2004 |
| WO | WO 2004/058403 A2 | 7/2004 |

\* cited by examiner

*Primary Examiner*—Jean Gelin
(74) *Attorney, Agent, or Firm*—Alston & Bird LLP (57) ABSTRACT

A system is provided for configuring an application for operation onboard a mobile node that includes a plurality of communication interfaces for accessing a plurality of types of networks. The system includes a network entity that can send a request for an application-specific profile for operating an application onboard the mobile node, the request including information identifying the application. In response, a profile server can create/retrieve an application-specific profile based upon the request. The application-specific profile includes one or more application-specific preferences and/or one or more application-specific settings, where at least one of the application-specific preference(s) and/or setting(s) can be interpreted into one or more policy rules capable of at least partially controlling selection of one or more of the communication interfaces of the mobile node during operation of the application. The application can thereafter be configured at least partially based upon the application-specific profile independent of user input.

24 Claims, 5 Drawing Sheets

SYSTEM AND METHOD FOR AUTOMATIC APPLICATION PROFILE AND POLICY CREATION

BACKGROUND OF THE INVENTION

The mobile Internet Protocol (MIP) enables a mobile terminal to move freely from one point of connection to another in various networks it visits along its route. In particular, the MIP protocol describes those actions that enable a mobile terminal to maintain connectivity during a handover from one access router to another access router. For example, a mobile terminal operating in an enhanced third-generation (3G) wireless communication network such as 1XEV-DO (TIA/EIA/IS-856) may desire to move to a wireless local area network (WLAN), and vice versa. In a more particular example, consider a terminal user engaged in a voice over IP (VoIP) call in a 1XEV-DO network. When the user enters an area, such as the user's office, providing WLAN connectivity, the user may desire to move the VoIP call from the 1XEV-DO network to the WLAN, such as to obtain better or more economical connectivity, speed, quality of service (QoS) and the like.

Contexts such as that described above are generally applicable to mobile terminals that have communication interfaces that permit the mobile terminals to access networks via different interface technologies. In such instances, although various networks may be accessible via different interface technologies, in various instances different accessible networks differ in their data transmission characteristics, and/or in one or more other dimensions such as their administrative models. As will be appreciated, differing data transmission characteristics can impact the kind of applications that can operate over a given interface. And while the data flows of one or more applications may be mapped to different network interfaces, such mapping may require policy decision making within or remote from the respective mobile terminals.

As the number of communication interfaces and applications increase, the importance of the mobile terminal as a personal trusted device also typically increases. In spite of this increased system complexity, however, it is generally desirable to further simplify the users' interaction with the system, while also providing more personalized and automated services. In this regard, when downloading and/or installing new applications to a mobile terminal with multiple interfaces, application profile/settings specific to the respective applications are typically created to properly operate the applications within the terminal. Currently, terminal users may be required to manually configure such profile/settings, even though in many instances such profile/settings are difficult for users to understand, and thus configure.

SUMMARY OF THE INVENTION

In light of the foregoing background, exemplary embodiments of the present invention provide an improved system, network entity, profile server, method and computer program product for configuring an application onboard a mobile node that includes a plurality of communication interfaces for accessing a plurality of types of networks. In accordance with exemplary embodiments of the present invention, a mobile node (MN) may be configured with one or more base profiles that include base preferences and/or settings interpretable into base policy rules that generally control operation of the mobile node. In various instances, the mobile node may download or otherwise receive one or more applications for operation thereon. In such instances, before or as those applications are installed or otherwise initiated for operation, the applications can be automatically configured based upon application-specific profiles without user input. Similar to the base profiles, the application-specific profiles include preferences and/or settings, although these preferences and/or settings are specific to the respective applications. Thus, one or more applications installed on the mobile node may operate based upon base preferences and/or settings and/or respective application-specific preferences and/or settings without requiring the user to manually configure those applications for operation.

According to one aspect of the present invention, a system is provided for configuring an application for operation onboard a mobile node that includes a plurality of communication interfaces for accessing a plurality of types of networks. The system includes a network entity, such as the mobile node or an application-provisioning server, and a profile server located remote from the network entity. The network entity is capable of sending a request for an application-specific profile for operating an application onboard the mobile node. The request includes information capable of identifying the application such as, for example, an identifier (ID) associated with the application, and/or one or more characteristics and/or requirements of the application.

The profile server is capable of receiving the request, and in response thereto, creating or otherwise retrieving an application-specific profile based upon the request. The application-specific profile includes one or more application-specific preferences and/or one or more application-specific settings, where at least one of the application-specific preference(s) and/or setting(s) is capable of being interpreted into one or more policy rules capable of at least partially controlling selection of one or more of the communication interfaces of the mobile node during operation of the application.

After creating/retrieving the application-specific profile, the profile server can send the application-specific profile back to the network entity. Thereafter, the application can be configured at least partially based upon the application-specific profile, where the application is at least partially configured based upon the application-specific profile independent of user input. In addition, the application may also be further configured based upon at least one base profile. In this regard, the base profile(s) include one or more base preferences and/or settings that are capable of being interpreted into policy rule(s), which in turn, are capable of at least partially controlling operation of the mobile node including during operation of the application.

When the network entity comprises a mobile node, the system may further include an application-provisioning server capable of providing the application to the mobile node. In such instances, the mobile node can be capable of sending the request to the application-provisioning server, which in turn, is capable of sending a request to the profile server. Accordingly, the profile server can be capable of receiving the request from the application-provisioning server, and sending the application-specific profile to the application-provisioning server. Upon receiving the application-specific profile, the application-provisioning server can then be capable of sending the application-specific profile to the mobile node.

According to other aspects of the present invention, a network entity, profile server, method and computer program product are provided for configuring an application onboard a mobile node. Exemplary embodiments of the present invention therefore provide an improved system, network entity, method and computer program product for configuring an application. As indicated above, and explained below, in accordance with exemplary embodiments of the present invention, applications installed or otherwise initiated for operation onboard a mobile node can be automatically configured for operation from application-specific profiles. The application-specific profiles, then, can include one or more preferences and/or settings that are interpretable into policy rules at least partially controlling selection of one or more of the communication interfaces of the mobile node during operation of the application. Accordingly, the user need not manually configure the application for operation, and need not fully understand all of the preferences and/or settings with which the application is configured. As such, the system, network entity, method and computer program product of exemplary embodiments of the present invention may solve at least some of the problems identified by prior techniques and may provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
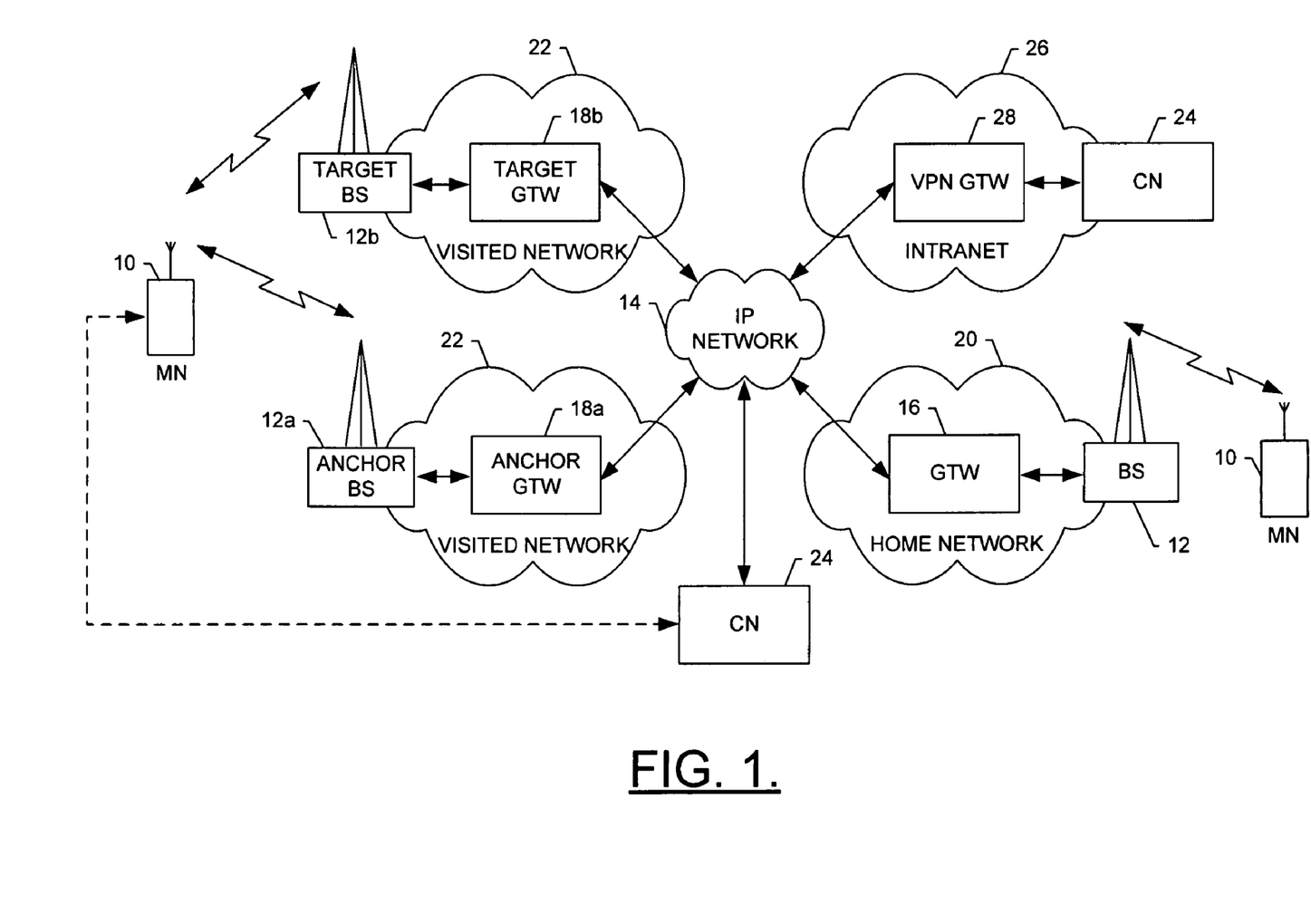
FIG. 1 is a block diagram of one type of mobile node and system that would benefit from exemplary embodiments of the present invention.

Referring to FIG. 1, an illustration of one type of system that would benefit from exemplary embodiments of the present invention is provided. The system, method and computer program product of exemplary embodiments of the present invention will be primarily described in conjunction with mobile communications applications. It should be understood, however, that the system, method and computer program product of exemplary embodiments of the present invention can be utilized in conjunction with a variety of other applications, both in the mobile communications industries and outside of the mobile communications industries. For example, the system, method and computer program product of exemplary embodiments of the present invention can be utilized in conjunction with wireline and/or wireless network (e.g., Internet) applications.

As shown, the system can include a mobile node (MN) 10 capable of transmitting signals to and for receiving signals from base sites or base stations (BS) 14 (one or more of which may be more particularly referred to as access points—APs), two of which are shown in FIG. 1. As shown and described below, the base stations can include an anchor BS 12*a* that provides access to one network (e.g., first type of network) and a target BS 12*b* that provides access to another network (e.g., second type of network) during handoff. One or more base stations are part of one or more cellular or mobile networks that each include elements required to operate the network, such as a mobile switching center (MSC) (not shown). As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center.

The MN 10 can also be coupled to a data network. For example, one or more BSs 12 can be coupled to one or more data networks, such as a local area network (LAN), a metropolitan area network (MAN), and/or a wide area network (WAN). In one typical embodiment, the BS is coupled to a gateway (GTW), which is coupled to the data network, such as an Internet Protocol (IP) network 14. The GTWs can comprise any of a number of different entities capable of providing network connectivity between the MN and other nodes directly or indirectly coupled to the data network. As shown, the GTWs can include a home GTW 16 comprising a router within a home network 20 of the MN, as well as one or more visited GTWs comprising router(s) within one or more visited networks 22 of the MN. As shown, during handoff of the MN from one visited network to another, the GTWs of the respective networks may operate as an anchor GTW 18*a* coupled to the anchor BS 12*a* and a target GTW 18*b* coupled to the target BS 12*b*. It should be understood, however, that during handoff from or to the home network, the home GTW may likewise operate as an anchor or target GTW.

As will be appreciated, the GTWs 16, 18 can be described in any of a number of different manners, such as a home agent (HA), foreign agent (FA), packet data serving node (PDSN), access router (AR) or the like. In this regard, as defined in the MIP (MIP) protocol, a HA comprises a router within the home network 20 of the MN 10. The HA is capable of tunneling data for delivery to the MN when the MN is away from home, and can maintain current location information for the MN. A FA, on the other hand, comprises a router within a visited network 22 of the MN. The FA provides routing services to the MN while the MN is registered with the visited network. In operation, the FA detunnels data from the HA, and delivers the data to the MN. Then, for data sent from a MN registered with the visited network, the FA can serve as a default router. Although exemplary embodiments of the present invention may be described with reference to a MIP protocol, such as MIPv4 or MIPv6, it should be understood that exemplary embodiments of the present invention may operate in accordance with any of a number of other protocols.

The other nodes coupled to the MN 10 via the IP network 14 can comprise any of a number of different devices, systems or the like capable of communicating with the MN in accordance with exemplary embodiments of the present invention. The other nodes can comprise, for example, GTWs to other networks, personal computers, server computers or the like. Additionally or alternatively, for example, one or more other nodes can comprise other MNs, such as mobile telephones, portable digital assistants (PDAs), pagers, laptop computers, or the like. As described herein, a node capable of communicating with the MN via the IP network is referred to as a correspondent node (CN) 24, one of which is shown in FIG. 1. It should be understood, however, that in various instances a MN may be capable of directly communicating with one or more CNs, such as in accordance with any of a number of different short-range communication techniques. For example, a MN may be capable of directly communicating with a CN in accordance with radio frequency (RF), Bluetooth (BT), infrared (IrDA), universal serial bus (USB) or any of a number of different wireline or wireless communication techniques, including LAN techniques, WLAN techniques such as IEEE 802.11, WiMAX techniques such as IEEE 802.16 or the like.

One or more CNs 24 may be coupled to the IP network via one or more Intranets 26, one of which is illustrated in FIG. 1. Each Intranet generally comprises a private network contained within an enterprise. Each Intranet can comprise one or more interlinked LANs, as well as portions of one or more LANs, MANs, WANs or the like. As with the IP network, CNs can be coupled to the Intranet, and thus the IP network and MN, via the Intranet. Like various other components of the system, the Intranet, and thus the CNs of the Intranet, is typically indirectly coupled to the IP network, and thus the MN, via a GTW. Similarly, although not shown, each network or portion of a network included within the Intranet can be interconnected with one another via a gateway. A MN is capable of accessing the Intranet, and thus CNs of the Intranet, by establishing a Virtual Private Network (VPN) across a GTW to the Intranet, and if so required, across one or more other gateways within the Intranet. In such instances, then, the GTW is typically referred to as a VPN GTW 28, as shown in FIG. 1.

Although not every element of every possible network is shown and described herein, it should be appreciated that the MN 10 can be coupled to one or more of any of a number of different networks. In this regard, mobile network(s) can be capable of supporting communication in accordance with any one or more of a number of second-generation (2G), 2.5G, third-generation (3G) and/or fourth-generation (4G) mobile communication protocols or the like. Additionally or alternatively, mobile network(s) can be capable of supporting communication in accordance with any of a number of different wireless networking techniques, including WLAN, WiMAX or the like. Further, for example, the mobile network(s) can be capable of supporting communication in accordance with any one or more of a number of different digital broadcast networks, such as Digital Video Broadcasting (DVB) networks including DVB-T (DVB-Terrestrial) and/or DVB-H (DVB-Handheld), Integrated Services Digital Broadcasting (ISDB) networks including ISDB-T (ISDB-Terrestrial), or the like.

More particularly, for example, the MN 10 can be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as cdma2000, Universal Mobile Telephone System (UMTS) network employing Wideband Code Division Multiple Access (WCDMA) radio access technology. Further, one or more of the network(s) can be capable of supporting enhanced 3G wireless communication protocols such as 1XEV-DO (TIA/EIA/IS-856) and 1XEV-DV.

Figure 2:
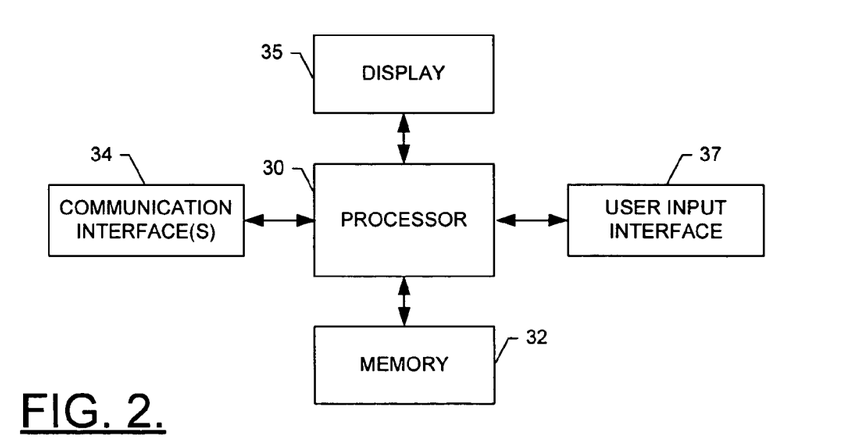
FIG. 2 is a schematic block diagram of an entity capable of operating as a mobile node, gateway and/or correspondent node, in accordance with exemplary embodiments of the present invention.

Referring now to FIG. 2, a block diagram of an entity capable of operating as a MN 10, GTW 16, 18 and/or CN 24 is shown in accordance with one embodiment of the present invention. Although shown as separate entities, in some embodiments, one or more entities may support one or more of a MN, GTW and/or CN, logically separated but co-located within the entit(ies). For example, a single entity may support a logically separate, but co-located, GTW and CN.

The entity capable of operating as a MN 10, GTW 16, 18 and/or CN 24 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include means, such as a processor 30 connected to a memory 32. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with embodiments of the present invention. As explained below, for example, the memory can store client application(s).

As described herein, the client application(s) may each comprise software operated by the respective entities. It should be understood, however, that any one or more of the client applications described herein can alternatively comprise firmware or hardware, without departing from the spirit and scope of the present invention. Generally, then, the MN 10, GTW 16, 18 and/or CN 24 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (i.e., MN, GTW, CN, etc.) or more particularly, for example, a processor 30 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like), may be transmitted to a semiconductor fabrication facility or "fab" for fabrication.

In addition to the memory 32, the processor 30 can also be connected to at least one interface or other means for displaying, transmitting and/or receiving data, content or the like. In this regard, the interface(s) can include at least one communication interface 34 or other means for transmitting and/or receiving data, content or the like. As explained below, for example, the communication interface(s) can include a first communication interface for connecting to a first network, and a second communication interface for connecting to a second network. In addition to the communication interface(s), the interface(s) can also include at least one user interface that can include a display 35 and/or a user input interface 37. The user input interface, in turn, can comprise any of a number of devices allowing the entity to receive data from a user, such as a keypad, a touch display, a joystick or other input device.

Figure 3:
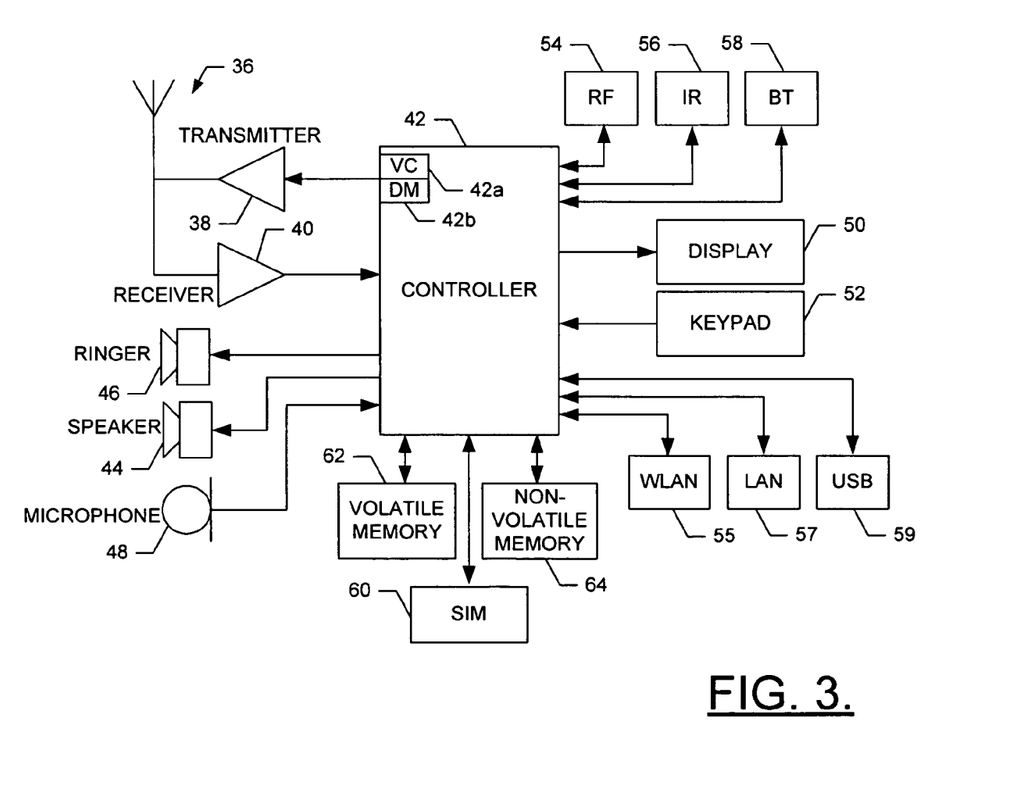
FIG. 3 is a schematic block diagram of a mobile node, in accordance with one embodiment of the present invention.

Reference is now made to FIG. 3, which illustrates one type of MN 10 that would benefit from exemplary embodiments of the present invention. It should be understood, however, that the MN illustrated and hereinafter described is merely illustrative of one type of MN that would benefit from the present invention and, therefore, should not be taken to limit the scope of the present invention. While several exemplary embodiments of the MN are illustrated and will be hereinafter described for purposes of example, other types of MNs, such as portable digital assistants (PDAs), pagers, laptop computers and other types of electronic systems, can readily employ exemplary embodiments of the present invention.

The MN 10 includes various means for performing one or more functions in accordance with exemplary embodiments of the present invention, including those more particularly shown and described herein. It should be understood, however, that the MN may include alternative means for performing one or more like functions, without departing from the spirit and scope of the present invention. More particularly, for example, as shown in FIG. 3, in addition to an antenna 36, the MN 10 can include a transmitter 38, receiver 40, and means, such as a controller 42 or other processor, that provides signals to and receives signals from the transmitter and receiver, respectively. These signals include signaling information in accordance with the air interface standard of the applicable cellular system, and also user speech and/or user generated data. In this regard, the MN can be capable of operating with one or more air interface standards, communication protocols, modulation types, and access types. More particularly, the MN can be capable of operating in accordance with any of a number of second generation (2G), 2.5G and/or third-generation (3G) communication protocols or the like. For example, the MN may be capable of operating in accordance with 2G wireless communication protocols IS-136 (TDMA), GSM and IS-95 (CDMA), 2.5G wireless communication protocols such as GPRS and/or Enhanced Data GSM Environment (EDGE), and/or 3G wireless communication protocols such as cdma2000, Universal Mobile Telephone System (UMTS) network employing Wideband Code Division Multiple Access (WCDMA) radio access technology. Also, for example, the MN can also be capable of operating in accordance with enhanced 3G wireless communication protocols such as 1XEV-DO (TIA/EIA/IS-856) and 1XEV-DV.

It is understood that the controller 42 includes the circuitry required for implementing the audio and logic functions of the MN 10. For example, the controller may be comprised of a digital signal processor device, a microprocessor device, and various analog-to-digital converters, digital-to-analog converters, and other support circuits. The control and signal processing functions of the MN are allocated between these devices according to their respective capabilities. The controller can additionally include an internal voice coder (VC) 42a, and may include an internal data modem (DM) 42b. Further, the controller may include the functionality to operate one or more software programs, which may be stored in memory (described below). For example, the controller may be capable of operating a connectivity program, such as a conventional Web browser. The connectivity program may then allow the MN to transmit and receive Web content, such as according to HTTP and/or the Wireless Application Protocol (WAP), for example.

The MN 10 also comprises a user interface including a conventional earphone or speaker 44, a ringer 46, a microphone 48, a display 50, and a user input interface, all of which are coupled to the controller 42. The user input interface, which allows the MN to receive data, can comprise any of a number of devices allowing the MN to receive data, such as a keypad 52, a touch display (not shown) or other input device. In embodiments including a keypad, the keypad includes the conventional numeric (0-9) and related keys (#, *), and other keys used for operating the MN. Although not shown, the MN can include a battery, such as a vibrating battery pack, for powering the various circuits that are required to operate the MN, as well as optionally providing mechanical vibration as a detectable output.

The MN 10 can also include one or more means for sharing and/or obtaining data. For example, the MN can include a short-range radio frequency (RF) interface 54 so that data can be shared with and/or obtained from electronic devices in accordance with RF techniques. In this regard, the RF interface may function as a WLAN and/or WAN interface capable of sharing data with other radio frequency interfaces in accordance with WLAN and/or WAN techniques. More particularly, for example, the RF interface may function as a WLAN interface, or the MN may include a separate WLAN interface 55, capable of sharing data in accordance with WLAN techniques such as IEEE 802.11, WiMAX techniques such as IEEE 802.16 or the like. Similarly, for example, the MN can include a separate WAN interface 57 capable of sharing data in accordance with WAN techniques. The MN can additionally or alternatively include other wireline and/or wireless interfaces. For example, the MN can include a universal serial bus (USB) interface 59, and/or short-range wireless interfaces, such as an infrared (IR) interface 56, and/or a Bluetooth (BT) interface 58 operating using Bluetooth brand wireless technology developed by the Bluetooth Special Interest Group. The MN can therefore additionally or alternatively be capable of transmitting data to and/or receiving data from electronic devices in accordance with such techniques.

The MN 10 can further include memory, such as a subscriber identity module (SIM) 60, a removable user identity module (R-UIM) or the like, which typically stores information elements related to a mobile subscriber. In addition to the SIM, the MN can include other removable and/or fixed memory. In this regard, the MN can include volatile memory 62, such as volatile Random Access Memory (RAM) including a cache area for the temporary storage of data. The MN can also include other non-volatile memory 64, which can be embedded and/or may be removable. The non-volatile memory can additionally or alternatively comprise an EEPROM, flash memory or the like. The memories can store any of a number of software applications, instructions, pieces of information, and data, used by the MN to implement the functions of the MN. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address, Session Initiation Protocol (SIP) address or the like, capable of uniquely identifying the MN.

A number of network entities of the-system (e.g., MN 10, CN 24, etc.) are configured to operate in accordance with a protocol stack, such as the protocol stack provided by the Open Systems Interconnection (OSI) model. As will be appreciated, the protocol stack may be implemented in software, hardware, firmware or combinations of the same. More particularly, the OSI model comprises seven layers, including an application layer, presentation layer, session layer, transport layer, network layer, data link layer and physical layer. The OSI model was developed by the International Organization for Standardization (ISO) and is described in ISO 7498, entitled: The *OSI Reference Model*, the contents of which are incorporated herein by reference in its entirety. Generally, each layer of the OSI model performs a specific data communications task, a service to and for the layer that precedes it (e.g., the network layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

Actual data flow between two entities (e.g., MN 10 and CN 24) is from top to bottom in the source entity, across the communications line, and then from bottom to top in the destination entity. Each time that user application data passes downward from one layer to the next layer in the same entity more processing information is added. When that information is removed and processed by the peer layer in the other entity, it causes various tasks (error correction, flow control, etc.) to be performed.

As explained in the background section, as the number of communication interfaces and applications of a MN 10 increase, the importance of the MN as a personal trusted device also typically increases. In spite of this increased system complexity, however, it is generally desirable to further simplify the users' interaction with the system, while also providing more personalized and automated services. In this regard, when downloading and/or installing new applications to a MN with multiple interfaces, application profile/settings specific to the respective applications are typically created to properly operate the applications within the terminal. Currently, MN users may be required to manually configure such profile/settings, even though in many instances such profile/settings are difficult for users to understand, and thus configure.

Therefore, in accordance with exemplary embodiments of the present invention, a MN 10 may be configured with one or more base profiles that include one or more base preferences (parameters that guide operation of the MN) and/or settings (parameters that restrict operation of the MN). The base preferences and/or settings can then be interpreted into one or more base policy rules that generally control operation of the MN. When various applications are installed or otherwise initiated on the MN, however, those applications can be automatically configured based upon application-specific profiles without user input, where the application-specific profiles include one or more preferences and/or settings specific to the respective applications. The application-specific preferences and/or settings can likewise be interpreted into one or more application-specific policy rules that control operation of the respective application, and thus the MN during operation of the respective application. In such instances, one or more of the application-specific preferences and/or settings may supersede one or more conflicting base preferences and/or settings during operation of the respective applications. Accordingly, applications installed on the MN may operate based upon base preferences and/or settings and/or respective application-specific preferences and/or settings.

As will be appreciated, application-specific profiles including one or more application-specific preferences and/or settings can be generated or otherwise provided in any of a number of different manners. As explained below, for example, one or more applications may be associated with one or more application identifiers. The application identifier(s), in turn, may be associated with one or more application-specific preferences and/or settings, and/or one or more application-specific profiles including one or more such parameters and/or settings. At some instance before or during installation or initiation of an application, application-specific preferences/settings and/or profile(s) can be retrieved based upon respective application identifier(s). An application-specific profile can then be generated or otherwise provided based upon the retrieved application-specific preferences/settings and/or profile(s).

Figure 4:
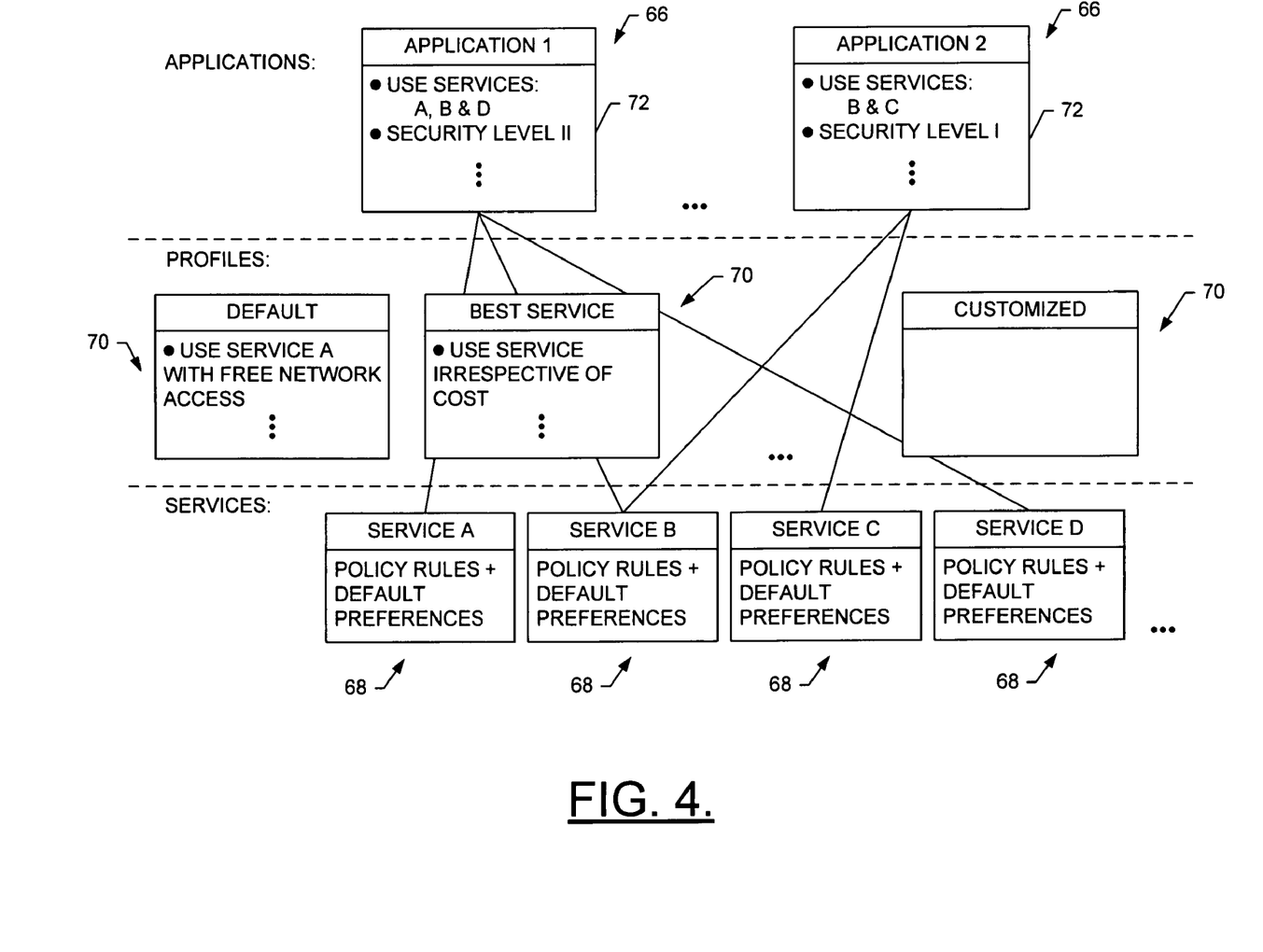
FIG. 4 is an schematic architecture diagram of a number of applications operating on top of a number of services onboard a mobile node, in accordance with exemplary embodiments of the present invention.

Reference is now made to FIG. 4, which illustrates an architecture diagram of a number of applications 66 (e.g., application 1, application 2, etc.) operating on top of a number of services 68 (e.g., service A, service B, service C, service D, etc.) onboard a MN 10 in accordance with exemplary embodiments of the present invention. As shown, the applications can comprise any of a number of different software applications including, for example, a WAP (Wireless Application Protocol) browser, file (e.g, MP3) transfer client, messaging (e.g., MMS, SMS, email, etc.) client, short-range connectivity OBEX (Object Exchange) engine, PC-connectivity, Bluetooth and IR stacks, PIM (personal information management) and/or telephony applications. Likewise, the services can comprise any of a number of different services accessible to the MN user via one or more applications. For example, the services can include IP browsing, IP real-time, IP background, messaging, telephony, video conferencing and/or VPN tunneling. In various instances the MN includes a number of different communication interfaces for accessing a number of different types of networks (e.g., WLAN, GPRS, VPN, etc.). In such instances, one or more of the services can be configured to communicate with one or more particular communication interfaces of the MN for accessing one or more particular types of networks to effectuate the respective services. In turn, one or more of the applications can be configured to communicate with one or more particular services for operating the respective application(s) via the respective service (s).

As also shown in FIG. 4, the MN 10 may be configured with one or more base profiles 70 that include one or more base preferences (parameters that guide operation of the MN) and/or settings (parameters that restrict operation of the MN). As shown, the base profiles can include a default profile as well as a best service profile and a customized profile. Although not shown, other examples of base profiles include user profiles, such as for silent operation or operation when the user is in a meeting, and/or "presence" profiles, such as for operation at work and/or at home. These base preferences and/or settings can then be interpreted into one or more base policy rules that generally control operation of the MN, such as during effectuation of a particular service 68. In addition, one or more of the applications 66 operating onboard the MN may be configured with application-specific profiles 72 including one or more preferences and/or settings specific to the respective applications, where these application-specific preferences and/or settings may also be interpreted into one or more application-specific policy rules that control operation of the respective application, such as during operation of the respective application(s) via particular services. As indicated above, then, one or more of the application-specific preferences and/or settings may supersede one or more conflicting base preferences and/or settings during operation of the respective applications.

As shown and described herein, the profiles can include any of a number of different base/application-specific preferences and/or settings upon which the MN 10 generally, and/or applications of the MN 10 more particularly, operate, such as to select the communication interface and thus the type of network that the MN/applications access during operation. For example, the one or more profiles can include preferences and/or settings related to price (e.g., cheapest price) where the cost to access different types of networks may be the dominating factor, or capacity (e.g., highest capacity) where quality of service (QoS) available in accessing different types of networks may be the dominating factor. Also, for example, one or more profiles can include preferences and/or settings related to services and/or availability (e.g., best services and/or availability) where network connectivity and/or service availability may be the dominating factors, and/or battery power where uptime (e.g., highest uptime) of the MN may be the dominating factor. Additionally or alternatively, for example, one or more profiles can include preferences and/or settings related to a level of control over the device for security purposes (maintenance and/or surveillance), service redirection, and/or customization of services for groups of MN users (e.g., employees of a company). Further, for example, one or more profiles can include preferences and/or settings related to control over services that a MN user accesses, roaming decisions or the like. As will be appreciated, the profiles can comprise any of a number of different preferences and/or settings from a number of different sources including, for example, MN users, information technology (IT) departments, network operators, service providers, or the like.

Figure 5:
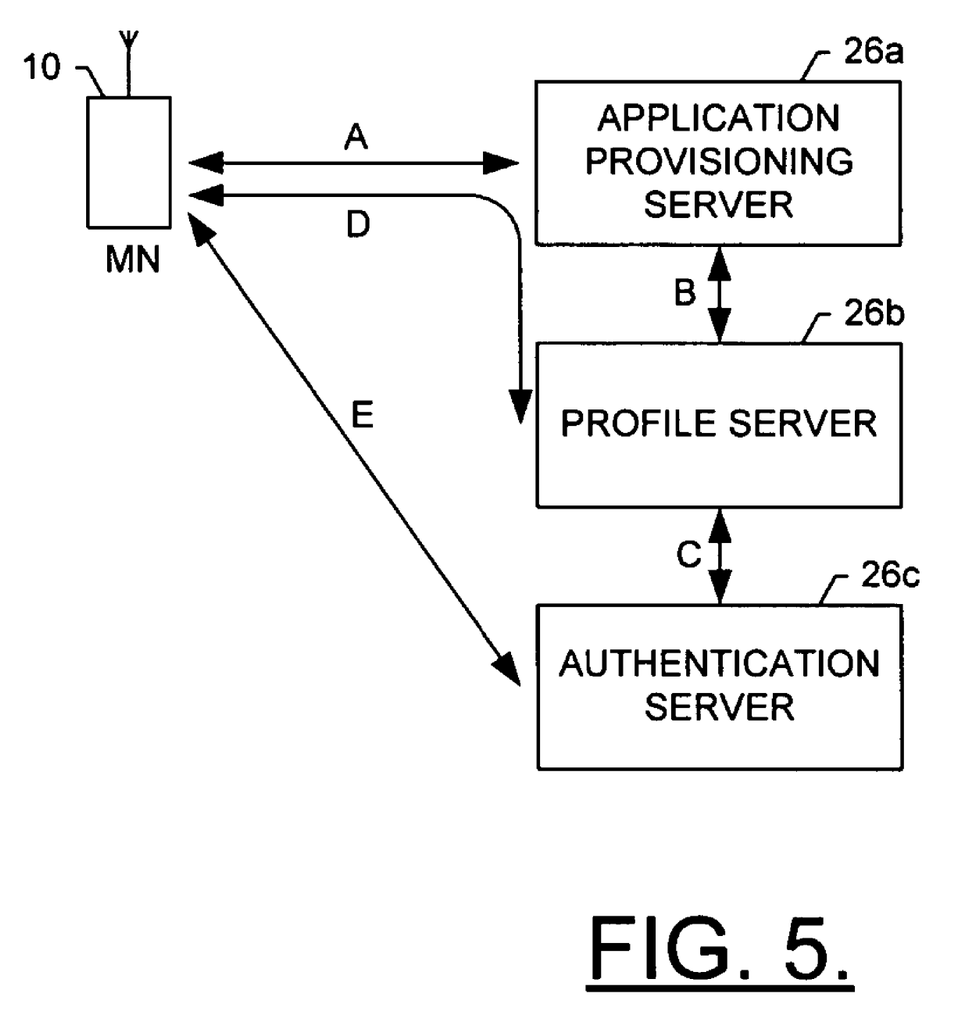
FIG. 5 is a schematic operational block diagram of the system of one exemplary embodiment of the present invention.
Figure 6:
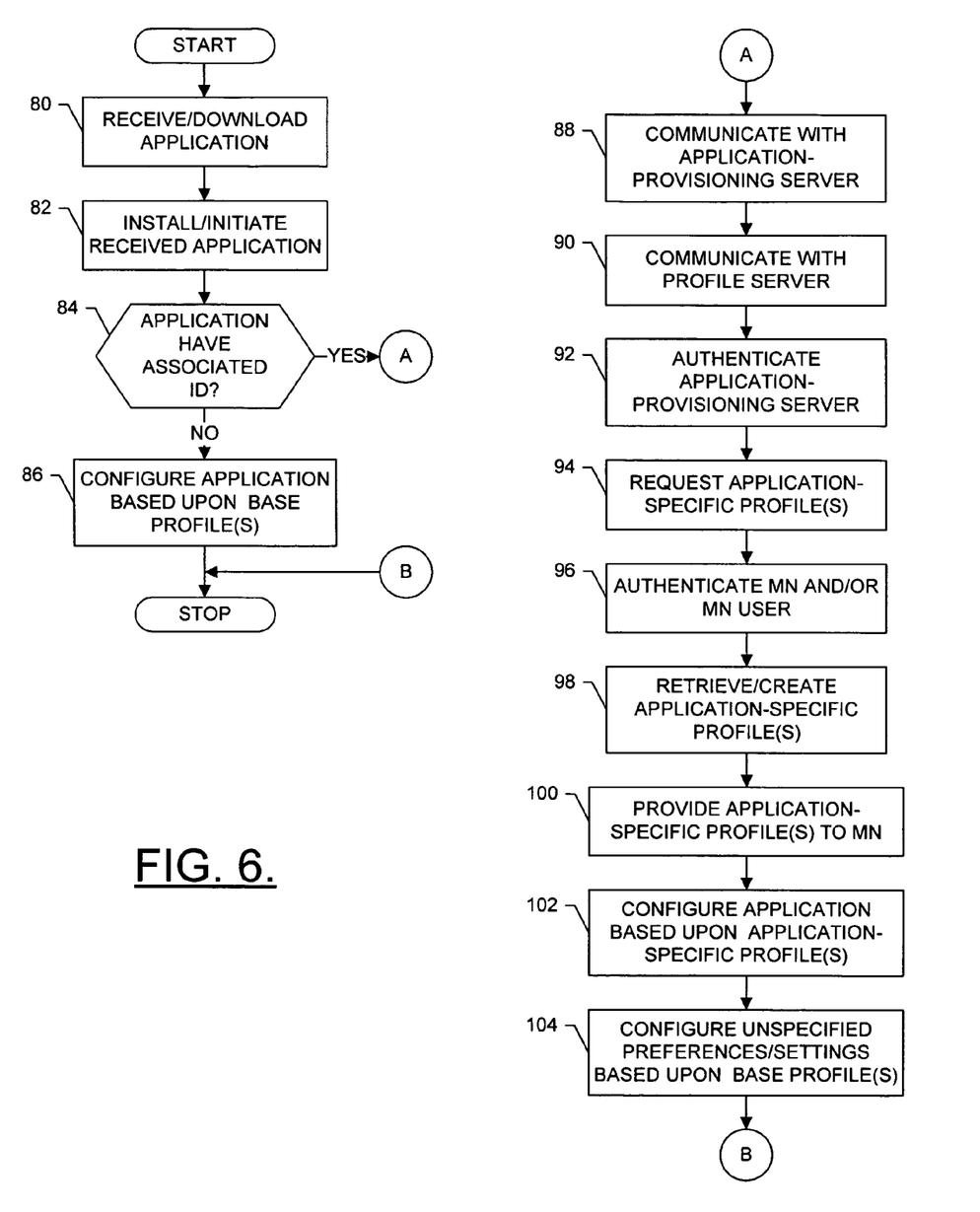
FIG. 6 is a flowchart illustrating various steps in a method of configuring an application onboard a mobile node, in accordance with one exemplary embodiment of the present invention.

Reference is now made to FIGS. 5 and 6, which illustrate an operational block diagram of a system and a flowchart of various steps in a method of configuring an application 66 in accordance with exemplary embodiments of the present invention. As shown in FIG. 5, to effectuate configuring an application, a MN 10 can communicate with a number of CNs, including an application provisioning server 26a, a profile server 26b and/or an authentication server 26c, via a number of different communication channels. More particularly, for example, MN can communicate with the application provisioning server across a communication channel A. The application provisioning server, in turn, can communicate with the profile server across channel B, and the profile server can communicate with the authentication server across channel C. Also, for example, the MN can communicate with the profile server across channel D, which may or may not pass through the application provisioning server therebetween. Further, for example, the MN can communicate with the authentication server across channel E. Similar to above, although shown as separate entities, in some embodiments, one or more entities may support one or more of a MN, application provisioning server, profile server and/or authentication server, logically separated but co-located within the entit(ies). For example, a single entity may support a logically separate, but co-located, application provisioning server and profile server, profile server and authentication server, or application provisioning server, profile server and authentication server. Additionally or alternatively, a single entity may support a logically separate, but co-located, MN and profile server, MN and authentication server, or MN, profile server and authentication server.

In accordance with one exemplary embodiment of the present invention, configuring an application 66 for operation onboard a MN 10 includes receiving or otherwise downloading an application at the MN, as shown in block 80. The application can be received or otherwise downloaded from any of a number of different sources in any of a number of different manners. In one embodiment, for example, the MN downloads the application from an application provisioning server 26a across communication channel A. At some point as or after the MN receives the application, the application is initiated or otherwise installed onboard the MN, as shown in block 82. In this regard, as the application is initiated/installed, the MN can determine if the application has an associated application profile identifier (ID), as shown in block 84. If the application does not have an associated application profile ID, the MN can proceed in a number of different manners. For example, the MN can proceed to initiate/install the MN by configuring the application based upon one or more base profiles 70, as shown in block 86. In this regard, if the MN includes one base profile, the MN can configure the application based upon that profile. If the MN includes more than one base profile, however, the MN can select a base profile or receive a selection of a base profile, and/or select one or more preferences and/or settings from more than one base profile and/or receive a selection of one or more preferences and/or settings from more than one base profile.

If the application 66 does have an associated application profile ID, the MN 10 can proceed to initiate/install the MN by configuring the application based upon one or more application-specific profile(s) 72 at least one of which is capable of being identified based upon the respective ID. In this regard, configuring the application based upon application-specific profile(s) can include communicating with an application provisioning server 26a, which may be the same or different from the server that provided the application to the MN, as shown in block 88. The application provisioning server can be selected in any one of a number of different ways. For example, the application provisioning server can be selected by pre-configuring the application to direct the MN to receive application-specific profile(s) for the respective application from one of one or more particular application provisioning servers.

During communication with the application provisioning server 26a, the MN 10 can request application-specific profile(s) 72 for the respective application 66, where the request can include the application profile ID and may include one or more other pieces of information. For example, the profile request can also include an ID of a policy server 26b providing policy services to the MN, if so desired or otherwise required. Additionally or alternatively, for example, the profile request can also include ID(s) associated with the MN and/or MN user, and/or one or more pieces of information related to capabilities of the MN (e.g., included communication interfaces, etc.). Upon receipt of the profile request, the application provisioning server can initiate communication with a profile server 26b across channel B to retrieve application-specific profile(s) for the respective application, such as based upon a profile server ID, as shown in block 90. As the application provisioning server initiates communication with the profile server, the profile server may require authentication of the application provisioning server, such as in any of a number of different manners, as shown in block 92. For example, the profile server can authenticate the application provisioning server in accordance with the generic authentication architecture (GAA).

Presuming the profile server 26b successfully authenticates the application provisioning server 26a, the application provisioning server can request application-specific profile(s) 72 based upon the application profile ID and, if so desired or otherwise necessary, one or more other pieces of information such as, for example, ID(s) associated with the MN 10 and/or MN user, and/or one or more pieces of information related to capabilities of the MN (e.g., included communication interfaces, etc.), as shown in block 94. Upon receipt of the request from the application provisioning server, the profile server may additionally require authentication of the MN and/or MN user, such as in any of a number of different manners, as shown in block 96. For example, the profile server can authenticate the MN and/or MN user by communicating with the MN across channel D, such as in accordance with GAA. To authenticate the MN and/or MN user, the profile server may communicate with an authentication server 26c across channel C. In such instances, the MN and/or MN user may have a predefined security association (SA), previously established across channel E.

In response to the request from the application provisioning server 26a, and presuming the MN 10 and/or MN user is authenticated (if required), the profile server 26b can retrieve or otherwise create application-specific profile(s) 72 based upon the request, such as in any of a number of different manners, as shown in block 98. For example, the profile server can retrieve application-specific profile(s) based upon the application profile ID in the request, such as from a database of application-specific profile(s) maintained by the profile server. Alternatively, the profile server can create application-specific profile(s) based upon the application profile ID in the request, such as from a database of application-specific parameters and/or settings maintained by the profile server. Additionally or alternatively, for example, the profile server can retrieve or otherwise create application-specific profile(s) based upon the MN and/or MN user, as such may be identifiable from the MN and/or MN user ID(s), and/or information related to the capabilities of the MN. More particularly, for example, the profile server can retrieve application-specific profile(s) based upon the application profile ID and further based upon the MN, MN user and/or MN capability information, such as from the database of application-specific profile(s). Alternatively, the profile server can create application-specific profile(s) based upon the application profile ID and further based upon the MN, MN user and/or MN capability information, such as from the database of application-specific parameters and/or settings.

When the profile server 26b retrieves or otherwise creates application-specific profile(s) 72 based upon the MN and/or MN user, the database of application-specific profile(s) and/or the database of application-specific parameter and/or settings may include profile(s) and/or preference(s)/setting(s), respectively, associated with the respective MN ID and/or MN user ID. Those profile(s) and/or preference(s)/setting(s) may be previously specified by the user and stored in the respective database(s), such as during previous communication with the profile server. In addition to storing profile(s) and/or preference(s)/setting(s) associated with the MN ID and/or MN user ID, the profile server may store MN capability information associated with the MN ID and/or MN user ID. In such instances, the request to the application provisioning server 26a, and thus the profile server, need not include such capability information.

Irrespective of how the profile server 26b retrieves/creates application-specific profile(s) 72 for the application 66 being initiated/installed by the MN 10, the application-specific profile(s) can thereafter be provided to the MN, as shown in block 100. For example, profile server can thereafter transfer the application-specific profile(s) to the application provisioning server 26a in response to the request from the application provisioning server. In turn, the application provisioning server can transfer the application-specific profile(s) to the MN in response to the previous profile request from the MN. Upon receipt of the application-specific profile(s), the MN can proceed to initiate/install the MN by configuring the application based upon the application-specific profile(s), as shown in block 102. In addition, as one or more configurable preferences and/or settings of the application may not be specified by the application-specific profile(s), the application may be further configured based upon one or more base profiles 70, such as to configure the unspecified preferences and/or settings of the application, as shown in block 104.

As explained above, the MN 10 receives or otherwise downloads an application 66, and when the application has an associated application profile ID, requests and thereafter receives application-specific profile(s) 72 for that application from an application provisioning server 26a (receiving the profile(s) from a profile server 26b). The MN can then configure the received/downloaded application based upon the application-specific profile(s). It should be understood, however, that the application can be configured with such application-specific profile(s) in any of a number of other manners. For example, in lieu of receiving the application and then receiving the application-specific profile(s) to configure the application, the MN can request the application from the application provisioning server. In response to the application request, the application provisioning server itself can request/receive application-specific profile(s), such as in the same manner explained above with respect to the MN requesting/receiving such profiles via the application provisioning server. Upon receiving the application-specific profile(s), the application provisioning server can configure the application, such as in the same manner as the MN, and thereafter transmit the configured application to the MN. Upon initiating/installing the application, then, the MN need not configure the application based upon the application-specific profile(s). And depending upon whether the application provisioning server further configures unspecified preferences and/or settings of the application based upon one or more base profiles 70, the MN may or may not need to further configure the application in this manner.

It should also be understood that the profile server 26b can at least partially retrieve or otherwise create application-specific profile(s) 72 without or independent of an application profile ID. In such instances, in addition to or lieu of an application profile ID, the request to the profile server can include one or more characteristics, requirements or the like of the respective application 66. For example, the request can identify a class or type of the application, such as a browsing application, file transfer application or the like. Additionally or alternatively, the request can identify QoS requirements, security requirements or the like of the application. In response to such a request, then, the profile server can retrieve or otherwise create application-specific profile(s) additionally or alternatively based upon such characteristics, requirements or the like. Generally, then, the request to the profile server can include information capable of at least partially identifying an application, where the information can include an application profile ID, and/or characteristics, requirements or the like of the application.

It should further be understood that the profile server 26b may retrieve or otherwise create application-specific profile(s) 72 for an application 66 in an incremental manner based upon multiple requests, and/or the MN 10 or application provisioning server 26a may incrementally configure the application based upon retrieved/created application-specific profile(s). In such instances, the profile server may receive multiple requests for application-specific profile(s), or for preference(s) and/or setting(s) of application-specific profile(s). And although the profile server may authenticate the application-provisioning server, MN and/or MN user for each request, the profile server may more typically authenticate the application-provisioning server, MN and/or MN user for the first request and maintain that authentication for each subsequent request with respect to the same application-provisioning server, MN, MN user and/or application.

Moreover, although one or more of the application-specific preferences and/or settings may supersede one or more conflicting base preferences and/or settings during operation of the respective applications, one or more base preferences and/or settings may be predefined as incapable of being superseded or as otherwise having a higher priority. In such instances, although an application-specific preference and/or setting may conflict with a corresponding predefined preference and/or setting, the application can be configured based upon the respective base preference and/or setting in lieu of the otherwise superseding application-specific preference and/or setting. Alternatively, the MN 10 may solicit, and thereafter receive, user input selecting to configure the application based upon the respective base preference and/or setting, or the otherwise superseding application-specific preference and/or setting.

Further, it should be understood that although the profile server 26b is capable of providing application-specific profile(s) including application-specific preferences and/or settings, the profile server may also be capable of providing other preferences and/or settings for at least partially controlling operation of the MN 10 and/or application 66. For example, the profile server may be capable of providing the MN with one or more base profile(s), and/or one or more base preferences and/or base settings. More particularly, for example, the profile server may be capable of providing the MN with addressing information such as an email address, home network IP address, telephone number or the like, and/or operation information such as country details, subscription details or the like.

Irrespective of exactly how an application 66 is configured, after initiating/installing the application, the application may thereafter be operated onboard the MN 10 at least partially based upon the application-specific/base profile(s) with which the application is configured. In this regard, before or as the application is operated, the MN can interpret the preferences and/or settings of the configured application-specific/base profile(s) into one or more application-specific policy rules that may be implemented by a policy manager (e.g., software application, firmware and/or hardware) to control operation of the respective application, and thus the MN during operation of the respective application. More particularly, for example, after configuring the application, the respective preferences and/or settings can be interpreted into application-specific policy rule(s) that are thereafter stored in a policy database maintained by the MN, such as in non-volatile memory (e.g., memory 32, 64). At one or more instances during operation of the application, then, the policy manager can receive a use case from the application describing one or more conditions under which the application is operating, or desires to operate. The policy manager can then process the use case based upon policy rule(s) in the policy database such that the policy manager can direct or otherwise control operation of the of the application consistent with the respective policy rule(s).

The policy rules controlling operation of the application 66, and thus the MN 10 during operation of the application, can comprise any of a number of different rules effectuating the configured preferences and/or settings. For example, consider instances in which the MN includes a number of different communication interfaces for accessing a number of different types of networks (e.g., WLAN, GPRS, VPN, etc.). In such instances, one or more policy rules may control the service(s) with which the application communicates to access the respective service(s), and/or the communication interface(s) with which the respective service(s) communicate to access respective type(s) of network(s), to effectuate operation of the application. In this regard, the communication interface(s) over which the applications communicate (via respective service(s)), and thus the types of network(s) accessed, such as during network connection, handoff or the like, can be selectively controlled at least partially based upon the policy rule(s) into which the configured preferences and/or settings are interpreted.

Consider, for example, interpreting preferences and/or settings configured for a data backup application (i.e., application 66) into one or more policy rules, where the data backup application communicates across a network during operation to backup data to a remote storage entity. In such an instance, a policy rule may specify that the application only operates with communication to a WLAN, and accordingly only communicates with a service 68 that communicates with a WLAN interface (i.e., communication interface) of the MN 10 to provide access to a WLAN when such a network is available. In another example, consider interpreting preferences and/or settings configured for a media (e.g., MP3 music) downloading application into one or more policy rules. In this instance, a policy rule may specify that the application only download new media over the least costly available network, and/or only download new media when the network is the least congested, such as at night.

According to one exemplary aspect of the present invention, the functions performed by one or more of the entities of the system, such as the MN 10, application provisioning server 26a, profile server 26b and/or authentication server 26c, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIG. 6 is a flowchart of systems, methods and program products according to exemplary embodiments of the present invention. It will be understood that each block or step of the flowchart, and combinations of blocks in the flowchart, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Many modifications and other exemplary embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for configuring an application for operation onboard a mobile node including a plurality of communication interfaces for accessing a plurality of types of networks, the system comprising:
    a network entity configured to send a request for an application-specific profile for operating an application onboard a mobile node, the request including information identifying the application; and
    a profile server located remote from the network entity, wherein the profile server is configured to receive the request, and in response thereto, one of create or retrieve an application-specific profile based upon the request, and send the application-specific profile to the network entity,
    wherein the application-specific profile includes at least one of at least one application-specific preference or at least one application-specific setting, wherein at least one of the at least one application-specific preference or at least one application-specific setting are interpretable into at least one policy rule for at least partially controlling selection of at least one of the communication interfaces of the mobile node during operation of the application, and
    wherein the profile server is configured to send the application-specific profile such that the application is thereafter configurable at least partially based upon the application-specific profile, the application being at least partially configured based upon the application-specific profile independent of user input.

2. A system according to claim 1, wherein the network entity is configured to send a request including an identifier associated with the application, and
    wherein the profile server is configured to one of create or retrieve the application-specific profile at least partially based upon the identifier.

3. A system according to claim 1, wherein the network entity is configured to send a request including at least one of at least one characteristic or at least one requirement of the application, and
    wherein the profile server is configured to one of create or retrieve the application-specific profile at least partially based upon the at least one of the at least one characteristic or the at least one requirement of the application.

4. A system according to claim 1, wherein the profile server is configured to send the application-specific profile such that the application is thereafter configurable further based upon at least one base profile, wherein the at least one base profile includes at least one of at least one base preference or at least one base setting, wherein at least one of the at least one base preference or at least one base setting are interpretable into at least one policy rule for at least partially controlling operation of the mobile node including during operation of the application.

5. A system according to claim 1, wherein the network entity comprises the mobile node, and wherein the system further comprises:
    an application-provisioning server configured to provide the application to the mobile node,
    wherein the mobile node is configured to send the request to the application-provisioning server, which in turn, is configured to send a request to the profile server,
    wherein the profile server is configured to receive the request from the application-provisioning server, and send the application-specific profile to the application-provisioning server, which in turn, is configured to send the application-specific profile to the mobile node.

6. A network entity for configuring an application for operation onboard a mobile node including a plurality of communication interfaces for accessing a plurality of types of networks, the network entity comprising:
    a processing element configured to send a request for an application-specific profile for operating an application onboard a mobile node, the request including information identifying the application, wherein
    the processing element configured to receive an application-specific profile in response to the request, the application-specific profile having been one of created or retrieved based upon the request, wherein the application-specific profile includes at least one of at least one application-specific preference or at least one application-specific setting, wherein at least one of the at least one application-specific preference or at least one application-specific setting are interpretable into at least one policy rule for at least partially controlling selection of at least one of the communication interfaces of the mobile node during operation of the application, and wherein the processing element is configured to receive the application-specific profile such that the application is thereafter configurable at least partially based upon the application-specific profile, the application being at least partially configured based upon the application-specific profile independent of user input.

7. A network entity according to claim 6, wherein the processing element is configured to send a request including an identifier associated with the application, and wherein the processing element is configured to receive an application-specific profile having been one of created or retrieved at least partially based upon the identifier.

8. A network entity according to claim 6, wherein the processing element is configured to send a request including at least one of at least one characteristic or at least one requirement of the application, and wherein the processing element is configured to receive an application-specific profile having been one of created or retrieved at least partially based upon the at least one of the at least one characteristic or the at least one requirement of the application.

9. A network entity according to claim 6, wherein the processing element is configured to send a request from the mobile node to a profile server located remote from the mobile node, and wherein the processing element is configured to receive an application-specific profile at the mobile node from the profile server in response to the request.

10. A network entity according to claim 6, wherein the processing element is configured to receive the application-specific profile such that the application is thereafter configurable further based upon at least one base profile, wherein the at least one base profile includes at least one of at least one base preference or at least one base setting, wherein at least one of the at least one base preference or at least one base setting are interpretable into at least one policy rule for at least partially controlling operation of the mobile node including during operation of the application.

11. A profile server for configuring an application for operation onboard a mobile node including a plurality of communication interfaces for accessing a plurality of types of networks, the profile server comprising:

a processing element configured to receive, from a network entity, a request for an application-specific profile for operating an application onboard a mobile node, the request including information identifying the application, wherein the processing element is configured to respond to the request by one of creating or retrieving an application-specific profile based upon the request, and send the application-specific profile to the network entity, wherein the application-specific profile includes at least one of at least one application-specific preference or at least one application-specific setting, wherein at least one of the at least one application-specific preference or at least one application-specific setting are interpretable into at least one policy rule for at least partially controlling selection of at least one of the communication interfaces of the mobile node during operation of the application, and wherein the processing element is configured to send the application-specific profile such that the application is thereafter configurable at least partially based upon the application-specific profile, the application being at least partially configured based upon the application-specific profile independent of user input.

12. A profile server according to claim 11, wherein the processing element is configured to receive a request including an identifier associated with the application, and wherein the processing element is configured to one of create or retrieve the application-specific profile at least partially based upon the identifier.

13. A profile server according to claim 11, wherein the processing element is configured to receive a request including at least one of at least one characteristic or at least one requirement of the application, and wherein the processing element is configured to one of create or retrieve the application-specific profile at least partially based upon the at least one of the at least one characteristic or the at least one requirement of the application.

14. A profile server according to claim 11, wherein the processing element is configured to send the application-specific profile such that the application is thereafter configurable further based upon at least one base profile, wherein the at least one base profile includes at least one of at least one base preference or at least one base setting, wherein at least one of the at least one base preference or at least one base setting are interpretable into at least one policy rule for at least partially controlling operation of the mobile node including during operation of the application.

15. A method of configuring an application for operation onboard a mobile node including a plurality of communication interfaces for accessing a plurality of types of networks, the method comprising:

sending a request for an application-specific profile for operating an application onboard a mobile node, the request including information identifying the application; and receiving an application-specific profile in response to the request, the application-specific profile having been one of created or retrieved based upon the request, wherein the application-specific profile includes at least one of at least one application-specific preference or at least one application-specific setting, wherein at least one of the at least one application-specific preference or at least one application-specific setting are interpretable into at least one policy rule for at least partially controlling selection of at least one of the communication interfaces of the mobile node during operation of the application, and wherein the application-specific profile is received such that the application is thereafter configurable at least partially based upon the application-specific profile, the application being at least partially configured based upon the application-specific profile independent of user input.

16. A method according to claim 15, wherein the sending step comprises sending a request including an identifier associated with the application, and wherein the receiving step comprises receiving an application-specific profile having been one of created or retrieved at least partially based upon the identifier.

17. A method according to claim 15, wherein the sending step comprises sending a request including at least one of at least one characteristic or at least one requirement of the application, and wherein the receiving step comprises receiving an application-specific profile having been one of created or retrieved at least partially based upon the at least one of the at least one characteristic or the at least one requirement of the application.

18. A method according to claim 15, wherein the sending step comprises sending a request from the mobile node to a profile server located remote from the mobile node, and wherein the receiving step comprises receiving an application-specific profile at the mobile node from the profile server in response to the request.

19. A method according to claim 15, wherein the application-specific profile is received such that the application is thereafter configurable further based upon at least one base profile, wherein the at least one base profile includes at least one of at least one base preference or at least one base setting, wherein at least one of the at least one base preference or at least one base setting are interpretable into at least one policy rule for at least partially controlling operation of the mobile node including during operation of the application.

20. At least one computer-readable storage medium having computer-readable program code portions stored therein, the computer-readable program code portions comprising:

a first executable portion for sending a request for an application-specific profile for operating an application onboard a mobile node, the request including information identifying the application; and a second executable portion for receiving an application-specific profile in response to the request, the application-specific profile having been one of created or retrieved based upon the request, wherein the application-specific profile includes at least one of at least one application-specific preference or at least one application-specific setting, wherein at least one of the at least one application-specific preference or at least one application-specific setting are interpretable into at least one policy rule for at least partially controlling selection of at least one of the communication interfaces of the mobile node during operation of the application, and wherein the second executable portion receives the application-specific profile such that the application is thereafter configurable at least partially based upon the application-specific profile, the application being at least partially configured based upon the application-specific profile independent of user input.

21. At least one computer-readable storage medium according to claim 20, wherein the first executable portion is adapted to send a request including an identifier associated with the application, and wherein the second executable portion is adapted to receive an application-specific profile having been one of created or retrieved at least partially based upon the identifier.

22. At least one computer-readable storage medium according to claim 20, wherein the first executable portion is adapted to send a request including at least one of at least one characteristic or at least one requirement of the application, and wherein the second executable portion is adapted to receive an application-specific profile having been one of created or retrieved at least partially based upon the at least one of the at least one characteristic or the at least one requirement of the application.

23. At least one computer-readable storage medium according to claim 20, wherein the first executable portion is adapted to send a request from the mobile node to a profile server located remote from the mobile node, and wherein the second executable portion is adapted to receive an application-specific profile at the mobile node from the profile server in response to the request.

24. At least one computer-readable storage medium according to claim 20, wherein the second executable portion is adapted to receive the application-specific profile such that the application is thereafter configurable further based upon at least one base profile, wherein the at least one base profile includes at least one of at least one base preference or at least one base setting, wherein at least one of the at least one base preference or at least one base setting are interpretable into at least one policy rule for at least partially controlling operation of the mobile node including during operation of the application.

* * * * *